Oct. 18, 1966

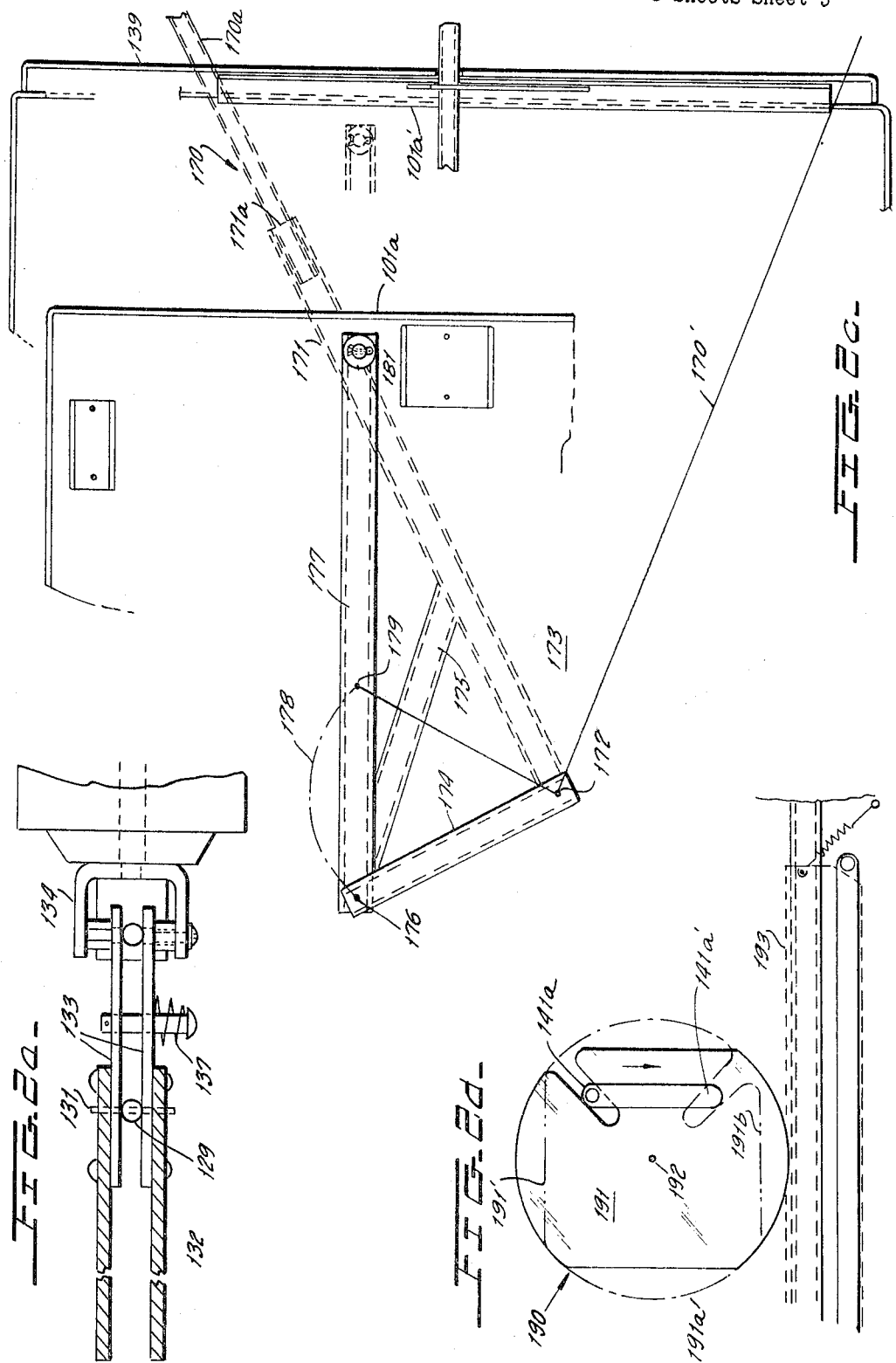

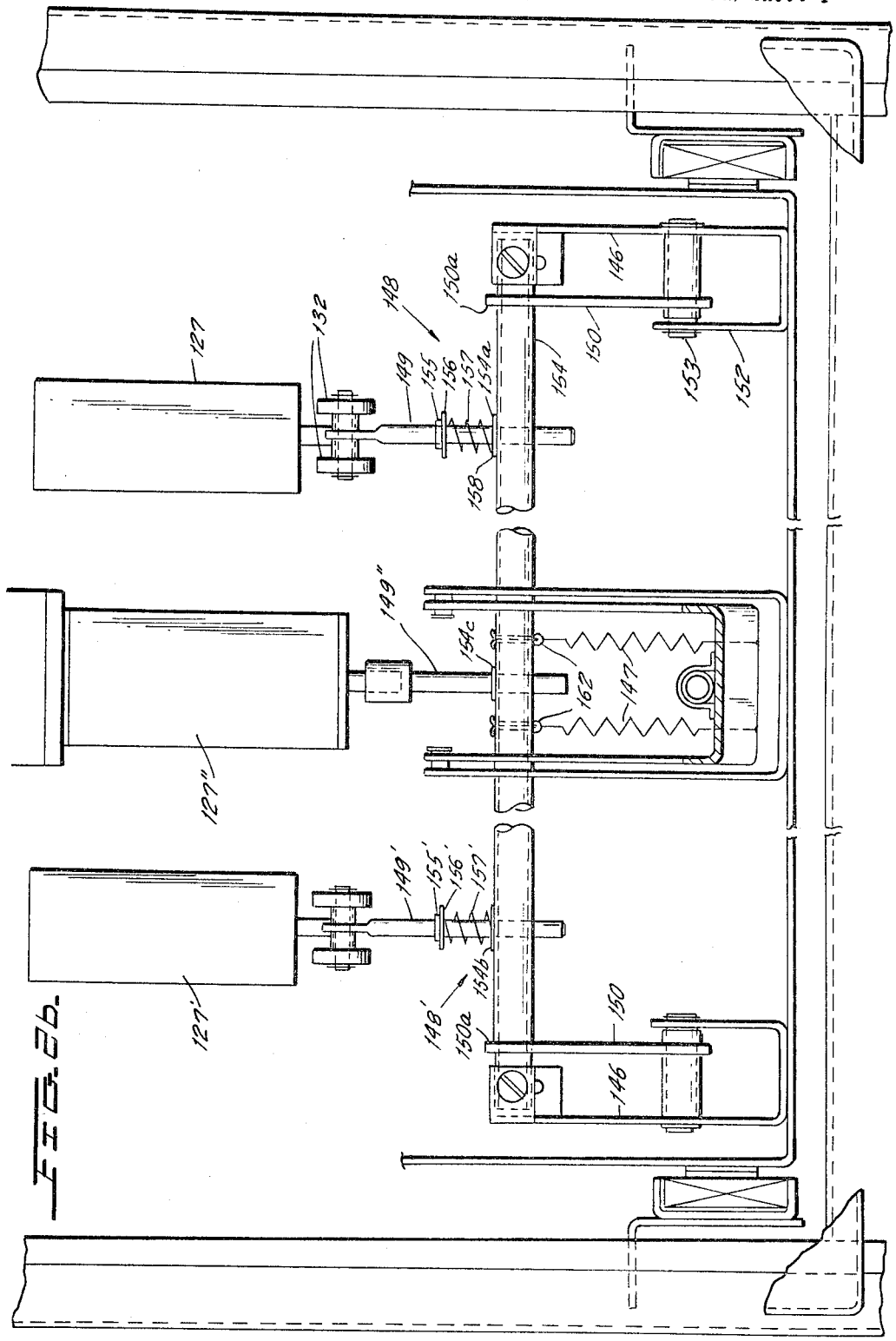

S. O. RODESEIKE ETAL 3,280,282

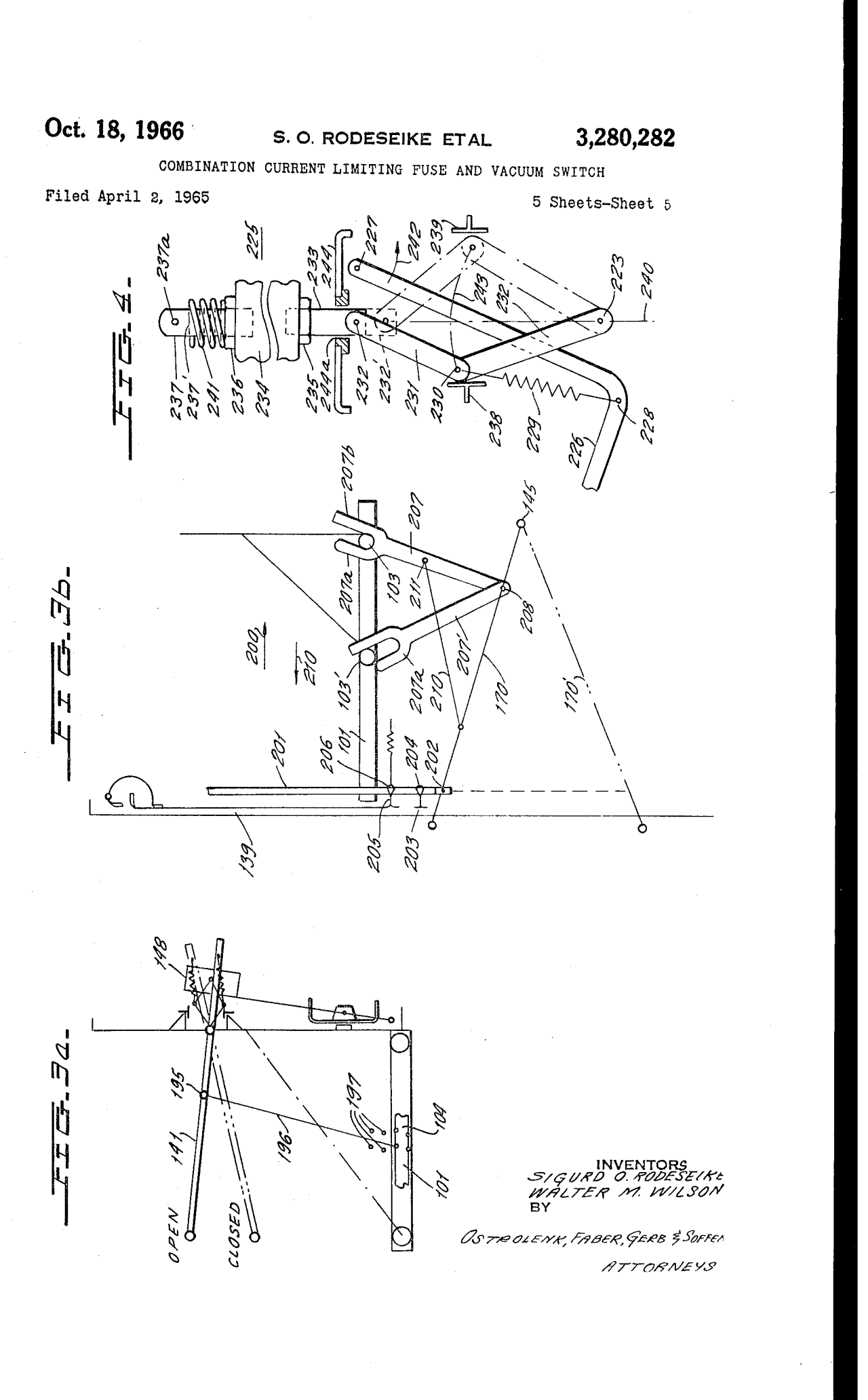

COMBINATION CURRENT LIMITING FUSE AND VACUUM SWITCH

Filed April 2, 1965

INVENTORS
SIGURD O. RODESEIKE
WALTER M. WILSON
BY

OSTROLENK, FABER, GERB & SOFFEN

ATTORNEYS

United States Patent Office 3,280,282
Patented Oct. 18, 1966

3,280,282
COMBINATION CURRENT LIMITING FUSE AND
VACUUM SWITCH
Sigurd O. Rodeseike and Walter M. Wilson, Greensburg,
Pa., assignors to I-T-E Circuit Breaker Company, Philadelphia, Pa., a corporation of Pennsylvania
Filed Apr. 2, 1965, Ser. No. 444,962
11 Claims. (Cl. 200—114)

The instant invention relates to electrical switches and more particularly to a protective switch assembly comprised of series connected current limiting fuse means directly coupled to vacuum switch means and preferably providing a three-phase interrupter switch arrangement adaptable for drawout operation which is considerably smaller and more compact than switches having substantially similar circuit protection capabilities.

The instant invention is comprised of a drawout type carriage, having upper and lower terminals slidably engageable with stationary upper and lower terminals contained within the cubicle adjacent the rear wall thereof. The drawout carriage is arranged to position and support a current limiting fuse and a vacuum switch connected in series fashion. The current limiting fuse is of conventional design and has characteristics which provide an inverse time delay relative to the magnitude of the fault which occurs in the circuit being protected. That is, for overload conditions, the current limiting fuse is designed to blow after a prolonged time duration, whereas in the case of a severe or short-circuit current condition, the current limiting fuse is designed to blow substantially instantaneously.

The vacuum switch connected in series therewith is operated by an over-center toggle assembly which is constructed so as to rapidly move the vacuum switch cooperating contacts into either the engaged, or disengaged position. In moving the vacuum switch to the disengaged position, this further acts to operate interlock means which is normally engaged in the connected position to prevent removal of the drawout carriage in this position. When moving the operating handle to the disconnected position the interlock becomes disengaged, allowing the carriage to be readily and easily removed. In one preferred embodiment the operating lever may further be coupled so as to place the carriage in motion toward the disengaged position during the opening stroke of the operating mechanism with the sequence of events being such as to cause the vacuum switch contacts to become disengaged prior to the time that the upper and lower terminals of the drawout carriage become disengaged from the cooperating upper and lower terminals provided at the rear of the switchgear housing.

Due to the fact that a vacuum switch is employed in cooperation with an over-center type toggle mechanism, the carriage switchgear assembly may be moved to the open position during the time that the circuit is energized, since the opening position occurs in a very rapid manner and since the vacuum switch characteristics are such as to substantially prevent the occurrence of arcing between the separating contacts. If desired, the opening operation may be performed automatically and/or under the control of a remote point by suitable solenoid means which may be energized by a current monitoring device contained within the circuit being protected. The drawout switchgear assembly may be adapted with equal success to both single-phase and multi-phase systems and provides an extremely simple and compact arrangement which combines the characteristics of a vacuum switch with a current limiting fuse structure.

The operating characteristics of the device of the instant invention are such that the load break capacity is determined by the vacuum switch, while the short circuit capacity is determined by the current limiting fuses, thereby making it possible to obtain momentary ratings well in line with modern requirements in systems having voltages of 5,000, 15,000 and higher ratings. The switch fuse combinations set forth above also makes it possible to close-in on energized circuits having available short circuit capacities far beyond that which a vacuum switch alone is capable of allowing. These operating characteristics, together with the mechanical features thereof, thereby provide a safe, new system for economically producing switching capacities exhibiting both long life and quiet operation.

It is therefore one object of the instant invention to provide a novel electrical switch for use in power distribution circuits and the like.

Another object of the instant invention is to provide a novel switch assembly employing a current limiting fuse, series connected with a vacuum switch assembly.

Still another object of the instant invention is to provide a novel switch assembly employing a current limiting fuse, series connected with a vacuum switch assembly wherein the vacuum switch assembly is operated between its open and closed position through overcenter toggle means.

Another object of the instant invention is to provide a novel switch assembly employing a current limiting fuse series connected with a vacuum switch assembly wherein the vacuum switch assembly is operated between its open and closed position through overcenter toggle means and wherein interlock means are coupled with the overcenter toggle means to prevent removal of the electrial switch assembly when in the fully connected position.

These and other objects of the instant invention will become apparent when reading the accompanying description and drawings in which:

FIGURE 2a shows a sectional view of the embodiment of FIGURE 2 taken along the lines A—A.

FIGURE 2b shows a front view of the toggle assembly of the embodiment of FIGURE 2.

FIGURE 2c shows a plan view of the operating handle of the embodiment of FIGURE 2, including means to move the switch assembly within the cubicle.

FIGURE 2d shows interlock means which may be employed in the embodiment of FIGURE 2.

FIGURES 3a and 3b side elevations of alternative interlock mechanisms which may be employed with the fused load interrupter of the instant invention.

FIGURE 4 shows an alternative toggle mechanism which may be employed in the load interrupter switches of the instant invention.

Figure 1:
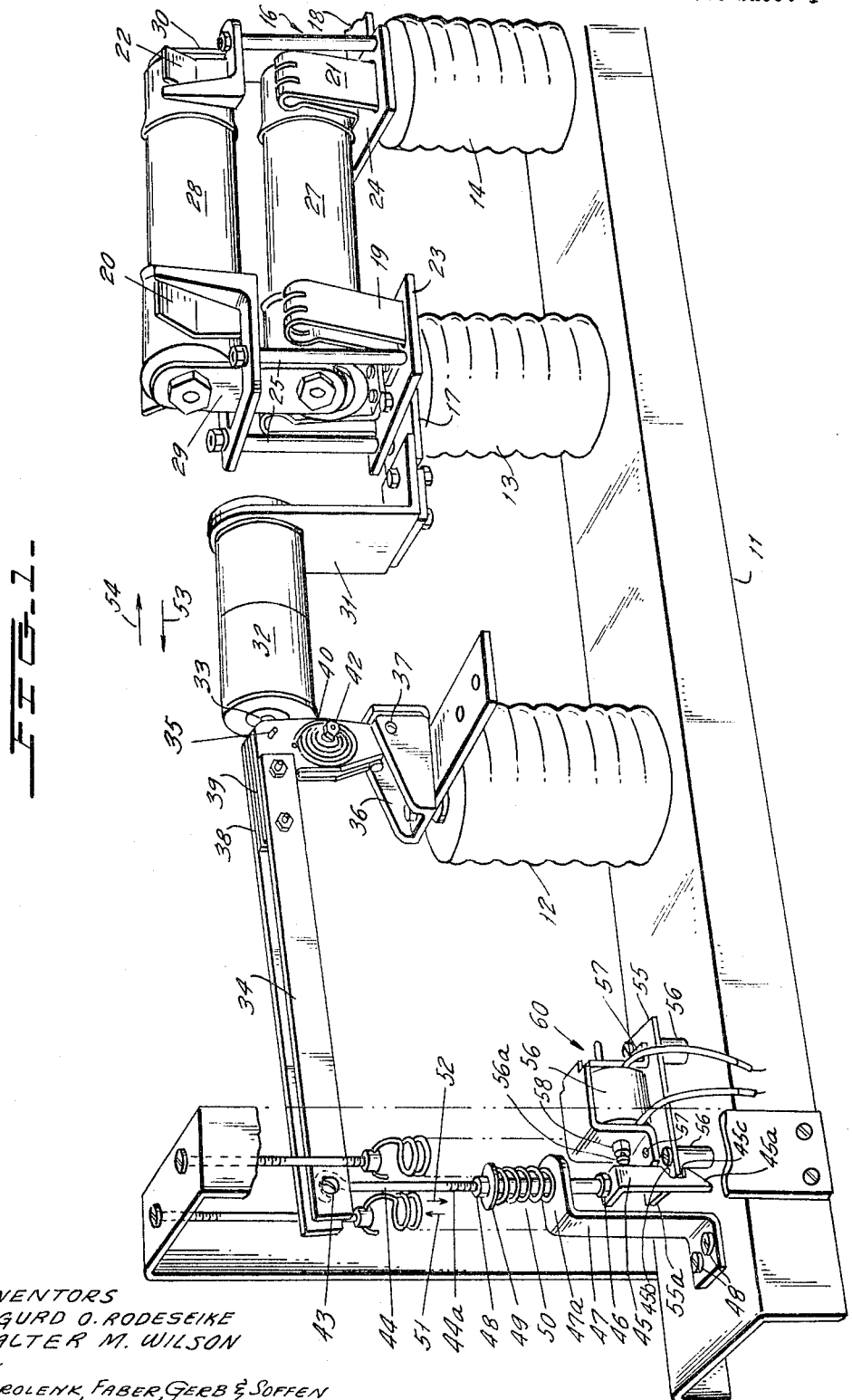
FIGURE 1 is a perspective view of a fused load interrupter switch designed in accordance with the principles of the instant invention.

Referring now to the drawings, FIGURE 1 shows a fuse-vacuum switch assembly 10 for use in a single pole operation. While only single pole operation is shown herein, it should be readily understood that the embodiment 10 of FIGURE 1 may be successfully used in multipole or multi-phase applications as well. The interrupter arrangement 10 is comprised of a base or support member 11 which mounts and supports three vertically aligned insulator members 12, 13 and 14. Insulators 13 and 14 are each provided with fuse mounting assemblies 15 and 16, respectively. Each of the fuse assemblies is provided with a terminal plate 17 and 18, respectively, which supports first and second fuse clips 19–20 and 21–22. Fuse clips 19 and 21 are secured by suitable fastening means to the plates 23 and 24, respectively. The upper fuse clips 20 and 22 are positioned and secured to plates 23 and 24, respectively, by suitable fastening means 25 and 26, respectively. The cooperating clips 19 and 21 receive the end caps of a first fuse member 27 while the upper fuse clips 20 and 22 receive the end caps of a second fuse member 28. Fuses 27 and 28 are coupled in parallel to one another by means of the shorting straps 29 and 30, respectively.

Terminal 18 is adapted to physically mount and electrically connect a conductor (not shown) to the first end of fuses 27 and 28. Terminal plate 17 is adapted to connect the opposite ends of fuses 27 and 28 to an L-bracket 31, one end of which is rigidly secured and electrically connected to a first end of vacuum switch 32. Although the specific design of vacuum switch 32 lends no novelty to the instant invention, it is sufficient to understand that the vacuum switch 32 is provided with a pair of cooperating contacts (not shown), one of which is preferably stationary and coupled to the L-bracket 31. The other contact is preferably movable and is coupled to a movable plunger member 33 which projects beyond the left-hand end of vacuum switch 32. Plunger 33 is pivotally linked to an L-shaped operating lever 34 by pin means 35. The lower end of operating lever 34 is pivoted to a stationary bracket 36 by means 37 about which the operating arm 34 is adapted to rotate. The operating arm 34 is preferably formed of a pair of such arms 38 and 39, which are preferably drawn toward one another by spring means 40, which bears against the face of bracket 39 at one end thereof and bears against the head of the fastening means 42 so as to urge members 38 and 39 toward one another.

The opposite ends of arms 38 and 39 are connected through a pivot means 43 to a vertically aligned rod 44 which has a notched blade member 45 having a tapered forward edge 45a and notch 45b which is secured to rod 44 by fastening means 46. A bracket 47 has its lower end secured to base member 11 by fastening means 48 and has a suitable aperture 47a provided in its upper arm for receiving rod 44 therethrough. Rod 44 is threaded at 44a so as to threadedly engage a nut 48 against which a washer member 49 is seated. A helical type spring 50 has rod 44 threaded therethrough and has its upper end bearing against washer 49 and its lower end bearing against the upper arm of bracket 47. Spring 50 normally urges rod 44 in the upper vertical direction, as shown by arrow 51.

In order to operate the vacuum switch to the open position, operating lever 34 is moved in a downward vertical direction, as shown by arrow 52. This causes the projecting plunger 33 of vacuum switch 32 to move in a direction shown by arrow 53, thus disconnecting the cooperating contacts (not shown) of vacuum switch 32. Typically, the gap between the cooperating contacts is approximately ¼". The downward movement of operating lever 34 in the direction shown by arrow 52, causes the notched member 45 to have its tapered edge 45a make sliding engagement with the left-hand edge 55a, of a plate 55, mounted to base 11 by suitable supports 56. As soon as the shoulder 45c of notch 45b moves to a point beneath the edge 55a of plate 55 operating lever 34 may be released with the result that the rod 44 is restrained from experiencing any upward vertical movement in the direction shown by arrow 51 due to the locking engagement of notch 45b with plate 55. In this position the cooperating contacts (not shown) of vacuum switch 32 are kept in a disengaged position.

In order to close the cooperating contacts of vacuum switch 32 a solenoid 56 is provided which is mounted upon plate 55 by fastening means 57. Solenoid 56 is provided with plunger means 56a which is designed to move in the direction shown by arrow 58 when solenoid 56 is energized. This causes member 45 to move in a direction shown by arrow 58, releasing the shoulder 45c of notch 45b from the edge 55a of plate 55. This causes the spring member 50 to gain control of operating rod 44, urging it rapidly in the upward vertical direction, as shown by arrow 51. This causes operating member 34 to pivot about point 37 moving the forward end and hence the plunger pin 33 in a direction shown by arrow 54 to rapidly close the cooperating contacts (not shown) of the vacuum switch 32.

If the reverse operation from that shown in FIGURE 1 is desired, i.e., if it is desired that the vacuum switch be operated to its open position automatically, and manually closed, this may readily be done by taking the assembly 60 and mounting it so as to be vertically above the operating lever 34 instead of positioning it vertically below, as has been already described. Thus, the operating lever 34 may be manually operated to the lock position, placing the cooperating contacts in the closed position, and the solenoid 56 may be energized from some remote location and under the control of a current monitoring device if desired, to automatically operate the cooperating contacts of vacuum switch 32 to the open or disconnected position.

Figure 2:
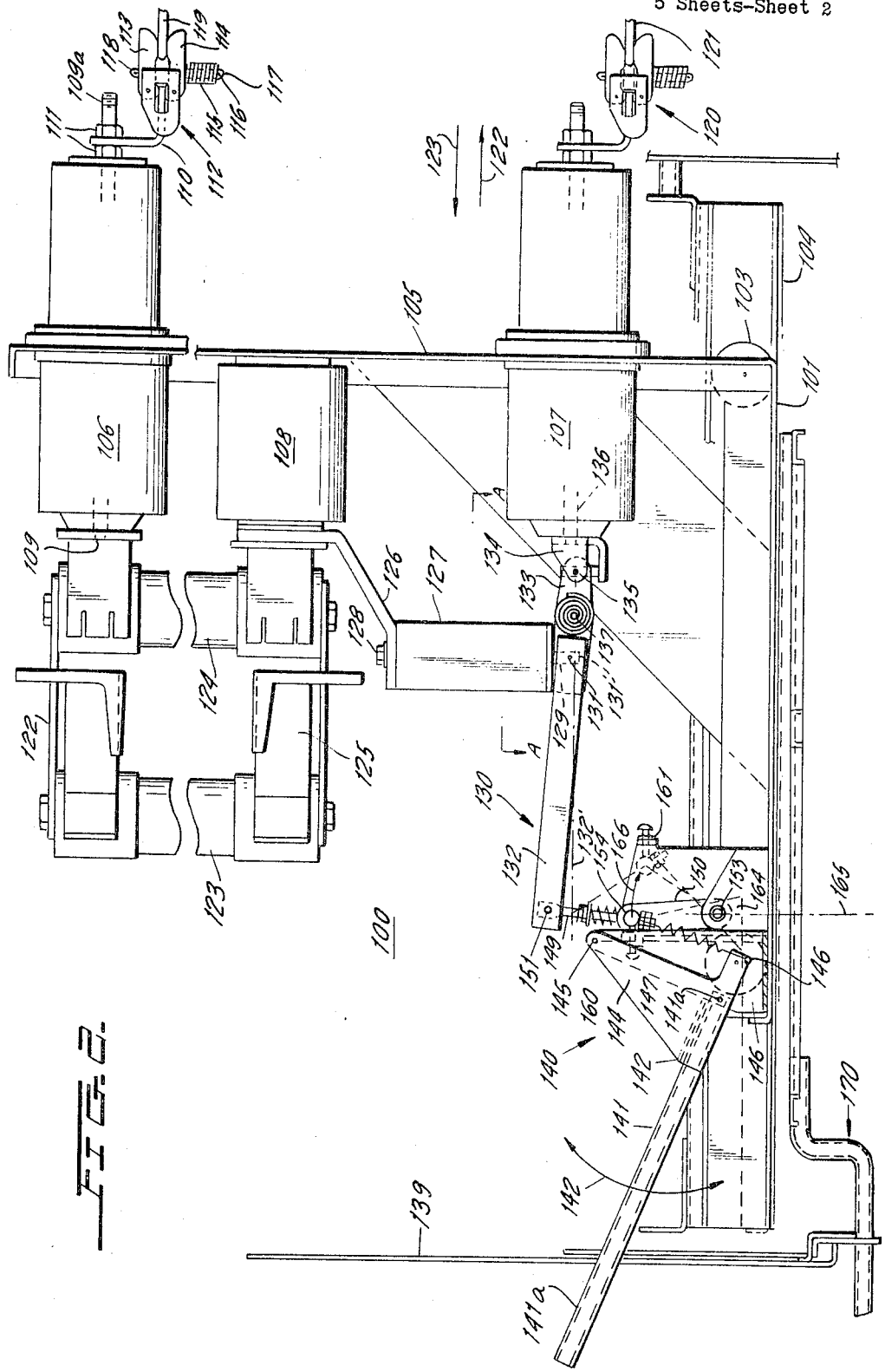
FIGURE 2 shows an elevational view of another preferred embodiment of the instant invention.

FIGURES 2—2d show a fused load interrupter switch 100 which is suitable for use in multi-pole or multi-phase, applications. The assembly 100 is comprised of a base member 101 provided with suitable roller members, or wheels, 102 and 103 along opposite sides thereof for receipt by suitable U-shaped channels 104 which may be positioned along opposite walls of a cubicle designed to receive the interrupter assembly 100. A vertical supporting wall 105 is integrally formed with the base 101 and is provided for the purpose of supporting upper and lower insulating members 106 and 107, as well as intermediate insulating member 108. Insulating member 106 is provided with an axially aligned conductor 109 passing through the center of insulator 106 and being electrically isolated from vertical support 105. The right-hand end of conductive member 109 is threaded at 109a and is coupled to an L-bracket 110 by fastening means 111. L-bracket 110 is provided with a suitable jaw-type disconnect arrangement provided with first and second co-operating members 113 and 114 which are biased toward one another by spring means 115 which bears against one edge of member 114 and against an abutting pin 116 provided in pin 117. The upper end of pin 117 is provided with a second abutting pin 118 to maintain the biasing arrangement in assembly with the cooperating members 113 and 114. Members 113 and 114 are biased toward one another so as to slidably and rigidly engage an upper terminal conductor 119 which is mounted in a stationary manner within the cubicle receiving the interrupter assembly.

The lower insulator 107 is provided with a similar assembly 120 for slidably engaging a lower stationarily mounted conductor 121 in a like fashion. It should be understood that when the interrupter assembly is moved in a direction shown by arrow 122, both jaw members 112 and 120 engage their cooperating conductors 119 and 121 in unison. Likewise, when the interrupter assembly moves in the direction shown by arrow 123, the jaw contacts 112 and 120 simultaneously disengage themselves from the stationary conductors 119 and 121, respectively.

The upper conductor 109 has mounted thereto a first fuse clip assembly for receiving first and second current limiting fuses with the fuse clip assembly being substantially identical to that shown in FIGURE 1. While first and second fuses have been shown connected in electrical parallel, it should be understood that a greater or lesser number of fuses may be used, depending only upon the application to which the interrupter assembly is to be used. The lower end caps of fuses 123 and 124 are supported by and electrically connected to a lower fuse clip assembly 125 which is rigidly supported by the intermediate insulator 108. The lower fuse clip assembly 125 is electrically connected to a conductor bracket 126, the lower end of which is electrically coupled to vacuum switch 127 by fastening means 128. The lower end of vacuum switch 127 is provided with a projecting plunger member 129 which is coupled to an operating arm assembly 130 by pin 131. The operating arm assembly is comprised of an elongated insulating arm 132 having its forward end rigidly secured to a metallic bracket 133 which is electrically connected to plunger 129 at a first end thereof and which is electrically connected to a bracket 134 at a second end thereof by means of pivot pin 135. Bracket 134 electrically connects lower conductor 136 to conductive arm 133, with conductor 136 being electrically coupled to the disconnect jaw 120. Metallic bracket 133 is preferably formed of a pair of arms which are biased toward one another by spring means 137 which is substantially similar to the spring means 40, shown in the embodiment 10 of FIGURE 1.

The operating mechanism 140 for vacuum switch 127 is an over-center toggle arrangement comprised of an operating handle 141, the left-hand end 141a of which protrudes through a suitable opening in the cubicle door 139. This opening is preferably an elongated vertically aligned slot enabling operating handle 141 to move in the arcuate path 142.

Operating handle 141 is preferably L-shaped with the handle portion 141 being formed of a suitable insulating material and being received by a suitable opening, or tube, 143 provided in the bracket 144 which forms a part of the handle assembly. Bracket 144 is pivotally connected by pin means 145 to a substantially U-shaped bracket 146 secured to the base 101 of the interrupter assembly 100. The insulating handle 141 is provided with suitable fastening means 141a at its forward end for rigidly securing handle 141 to bracket 144.

The forward end of bracket 144 is coupled by suitable fastening means 146 to the lower end of a biasing spring 147.

The toggle 148 is comprised of toggle links 149 and 150. Link 149 is coupled to the left-hand end of insulating arm 132 by pin means 151. Link 150 is coupled to bracket 152 by a pivoting assembly 153, which can best be seen in FIGURE 2b. Since the embodiment 100 of FIGURES 2–2d shows a three phase application for the interrupter assembly, it will be noted that two toggle assemblies 148 and 148' are provided for the interrupter assembly mounted near opposite sides of the assembly.

The upper end of link 150 receives an elongated rod 154 through a suitable aperture 150a which rod is provided with openings 154a, 154b and 154c, for receiving the upper toggle links 149, 149' and an intermediate toggle link 149". Each of the toggle links 149–149" is provided with a pin 155 and a washer 156 against which the upper end of a biasing member 157 bears. The lower end of biasing member 157 bears against a second washer 158 provided on upper toggle links 149–149". The elongated rod 154 forms the knee of the toggle assembly and is limited in the movement which it may undergo by the stops 160 and 161, secured to the brackets 146 and 146'.

The biasing means 147, which is preferably a pair of spring members is coupled at the upper end thereof by means of suitable cotter pins 162 to the elongated rod 154. Operation of the over-center toggle assembly 148 is as follows:

With the operating handle 141 in the solid line position, as shown in FIGURE 2, the spring means 147 has its lowermost end positioned to the left of the knee of toggle assembly 148. This causes the knee, or elongated rod 154 to be urged counter-clockwise with respect to the pivot pin 153, thus urging rod 154 against the stop 160. In this position the insulated arm 132 is in its upwardmost position, which maintains the vacuum switch 127 in the closed position through the projecting plunger pin 129. In order to open vacuum switch 127, the handle end 141a is moved substantially in the downward vertical direction, causing the spring means 147 to pass the dead-center position and move to the right of pivot pin 153 until it occupies the position shown by dotted line 164. As soon as the bottom dead-center position is passed, this position being represented by vertical line 165, the elongated rod 154 is rapidly urged in the direction shown by arrow 166 with its motion being limited by the stop means 161. When the rod 154 bears against stop means 161, this moves insulated arm 132 down to the position shown by dotted line 132'. This moves the pin 131 to the position 131', hence moving the projecting plunger 129 vertically downward, thereby disengaging or opening the cooperating contacts of vacuum switch 127.

In order to rapidly operate the vacuum switch cooperating contacts to the closed position, operating handle 141 is moved generally in the vertically upward direction, again causing the biasing means 147 to move beyond the bottom dead-center position represented by vertical line 165 so as to move the lower end of biasing means 147 to the left of this line, hence driving rod 154 away from stop 161 and against stop 160. It should be noted that the elongated rod 154, when rapidly moved by the biasing means 147 causes all of the upper toggle links 149, 149' and 149" to link this movement to its associated vacuum switch 127, 127' and 127", respectively.

While the embodiment shown in FIGURES 2 and 2b describes a three-phase interrupter assembly, it should be understood that the same arrangement may be used for a greater or lesser number of phases.

FIGURE 2a shows the manner in which the insulated arm 132 is coupled to the current carrying members 133 which, in turn, are pivotally linked to bracket 134. It can be seen from a consideration of FIGURE 2a that, while the current carrying members 133 electrically link the lower pin 129 of vacuum switch 127 with bracket 134, insulating members 132 prevent any electrical contact between the lower end of vacuum switch 127 and the toggle assembly 140.

FIGURE 2c shows the manner in which the interrupter assembly may be drawn out of the cubicle from the exterior of the cubicle door. FIGURE 2c shows the cubicle door 139 which is provided with a suitable horizontally aligned elongated slot (not shown) for receiving the forward end 170a of an operating handle 170. The forward end 170 is designed to be received through a suitable opening 171a in elongated rod 171 which forms a continuing arm of the operating handle. The left-hand end of this arm is pivoted at 172 by suitable pin means so as to link the arm to support member 173 in the cubicle. Arm portion 171 has rigidly coupled thereto a shorter arm 174 which is rigidly secured at right angles to arm 171 by a supporting strut 175. The topmost end of arm 174 is pivoted by suitable pin means 176 to an elongated member 177 which is designed to slide within the channel 104, shown in FIGURE 2, and is coupled at the forward end thereof to the interrupter assembly housing 101a which is an integral part of the base plate 101 for the interrupter assembly.

With the operating handle 170 in the sidewardmost position, as shown in FIGURE 2c, the interrupter assembly is in the fully connected position. In order to move it toward the disconnected position, the arm assembly 170 is moved to the position 170', represented by a center line, causing arm 171 and arm 174 to rotate clockwise about pin 172. This moves the rear end of member 177 along the arcuate path 178 to the position 180. Since the forward end of member 177 is pivotally linked to the interrupter assembly housing 101a by pivotal fastening means 181, this moves the housing and hence the entire interrupter assembly to the position 101a' causing the jaw disconnects 112 and 120 to be disengaged from their cooperating conductors 119 and 121, as shown in FIGURE 2.

In order to prevent removal of the interrupter assembly when the vacuum switches are in their engaged position, the interlock means 190 of FIGURE 2d may be employed. The interlock means 190 is comprised of a substantially rectangular-shaped plate 191 pivoted by suitable pin means 192 to the cubicle door or other removable panel provided across the front of the cubicle. With the cooperating contacts of the vacuum switches being in their closed position, this places the operating handle arm portion 141a in the uppermost position, as shown in FIGURE 2d. In this position the lower edge 191a of interlock member 191 is positioned behind an elongated plate 192 provided across the front of the cubicle and behind the cubicle door or removable panel. Since the door, or removable panel of the cubicle is linked to interlock member 191, the door is prevented from being opened due to the fact that the lower edge 191a of interlock member 191 is positioned behind the plate 192.

When operating handle 141a is moved clockwise toward the position which opens the contacts of vacuums switches 127–127'' the interlock member 191 rotates to the position 191', thus moving the edge 191a substantially away from plate 193. The edge 191b of interlock member 191 lies well above plate 193 so as to prevent any interlocking therebetween.

FIGURE 3a shows still another interlocking arrangement in the embodiment 100 shown therein. The operating rod 141 has coupled thereto at 195 a mechanical interlock rod 196, the lower end of which is designed to protrude through a suitable opening in cubicle channel 104, as well as a suitable opening in the housing base 101 of the interrupter assembly 100. With the operating handle in the open position, the lower end of rod 196 is free of channel 104 and housing 101, enabling the assembly to be slightly removed from the cubicle. With handle 151 in the closed position, rod 196 enters through the openings in housing 101 and channel 104 to prevent removal of the interrupter assembly. The guide pins 197 act to properly align the mechanical interlock rod 196 relative to the openings provided in channel 104 and housing 101.

FIGURE 3b shows still another interlock assembly 200. In this embodiment the manual operating lever 170 which pivots about point 145 has pivotally coupled thereto a mechanical interlock rod 201 at 202. Rod 201 is designed to be threaded through a suitable bracket 203 having an opening 204, as well as a suitable bracket 205, having an opening 206. Bracket 203 is mounted directly to the cubicle, while bracket 205 is mounted to the cubicle door or panel 139. In the connected, or closed position, it can be seen that the rod 201 threads through openings 204 and 206, thereby preventing opening of the door 139. When the operating handle 170 is moved to the disconnect position 170', the interlock rod 201 has its upper end free of opening 206 but still threading through the opening 204. This permits the cubicle door 139 to be open. Maintaining the upper end of rod 201 through opening 204 acts to properly align the rod to assure passage through the opening 206 the next time the assembly is moved to the connected position.

A substantially Y-shaped bracket member 207 has its lower end pivotally connected to operating lever 170 at 208. A bracing strut 210 is pivotally connected at 211 to Y-shaped member 207 and has its opposite end pivotally connected to operating rod 170 at 209. The arms 207a and 207b of Y-shaped member 207 are arranged to receive one of the rollers, or wheels, 103 of interrupter drawout assembly 100. This structure operates as follows:

With the operating lever 141 in the connected position, the roller 103 is captured between the arms 207a and 207b, thereby preventing the movement of the interrupter assembly 100. When the manual operating lever 141 is moved to the disconnected position 141', this causes the member 207 to rotate to the position 207' urging the interrupter assembly in a direction shown by arrow 210, as well as releasing roller 103 at position 103' from the forward arm 207a' when the operating lever 141 reaches the fully disconnected position 141'. Thus, it is possible to begin operating the switch toward the disconnected position and to move the interrupter assembly 100 out of its cubicle or housing with the sequence being such that the vacuum switch cooperating contacts separate at some time substantially prior to the time that the upper and lower terminals having jaws 112 and 120 become disconnected from the cooperating stationary conductors 119 and 121, respectively, as shown in FIGURE 2. Latching means is required to open vacuum switch first on withdrawal and to hold vacuum switch open until carriage is fully inserted on the closing cycle.

FIGURE 4 shows another preferred embodiment of a toggle mechanism which may be employed in the assembly of FIGURES 2–2d. As shown therein, the operating rod 226 of assembly 225 has its forward end pivoted at 227, preferably to the interrupter assembly housing (not shown). The knee of the operating rod 226 has coupled at 228 one end of a spring biasing means 229, the opposite end of which is coupled to pin 230, forming the knee of the toggle assembly. The toggle assembly is comprised of first and second toggle links 231 and 232. Toggle link 232 is pivoted at 233 through some suitable point on the interrupter assembly housing (not shown). The opposite end thereof is coupled through pin 230 to the lower end of toggle link 231. The upper end of toggle link 231 is coupled through pin 232 to a vertically aligned rod 233 suitably fastened to an insulator member 234 by fastening means 235. The upper end of insulator 234 is coupled through fastening means 236 to a second rod 237, having a suitable opening 237a for coupling the insulator arm 132 shown in FIGURES 2 and 2a of the application. First and second stops 238 and 239 are provided for limiting the travel of the knee of the toggle assembly. In the position shown in FIGURE 4 the spring means lies to the right of the dead center position, shown by phantom line 240, keeping the knee pin 230 of the toggle assembly firmly against stop 238. This maintains the rod 233 and hence the upper rod 237 in its upward most vertical position. The spring member 241, which bears against fastening means 236 and the pin provided in opening 237a is provided for the purpose of preventing any play between the rod 237 and its coupling with the insulated arm 132, shown in FIGURES 2 and 2a.

When the operating arm 226 is pivoted counterclockwise about pivot pin 227, as shown by arrow 242 this moves the lower end of spring member 229 through the dead center position 240 until the lower end passes to the right of line 240. As soon as this occurs, the pin 230 forming the knee of the toggle assembly is rapidly urged along the arcuate path 243 to drive the knee against stop 239. In this position the rod 233, and hence the upper rod 237, is drawn down to the position 232' and 237', respectively, to provide a disconnect switch opening operation. The plate 244 is provided with a suitable opening 244a for guiding the movement of rod 233.

It can be seen from the foregoing that the instant invention provides a fuse load interrupter assembly which provides series connected vacuum switch and current limiting fuse elements to yield the characteristic advantages of each in a simple, compact, drawout type of interrupter assembly.

Although there has been described a preferred embodiment of this novel invention, many variations and modifications will now be apparent to those skilled in the art. Therefore, this invention is to be limited, not by the specific disclosure herein, but only by the appending claims.

The embodiments of an invention in which an exclusive privilege or property is claimed are defined as follows:

1. Interrupter means comprising first and second terminals for coupling said interrupter means to the circuit being protected; a third terminal intermediate said first and second terminals; current limiting fuse means coupled between said first and third terminals; vacuum switch means having a pair of cooperating contacts coupled between said second and third terminals; first means for operating said vacuum switch means cooperating contacts between the engaged and disengaged position comprising spring means normally biasing said vacuum switch means cooperating contacts toward one of said positions; means for moving said vacuum switch means cooperating contacts toward the other of said positions.

2. The device of claim 1 further comprising latch means for locking said spring means in the charged position and said vacuum switch in one of its two discrete positions; relay means having an armature operative when said relay means is energized to abut said latch means for releasing said spring means to rapidly urge said vacuum switch means toward the other of its two discrete positions.

3. The device of claim 2 wherein said latch means is comprised of a stationary plate, a rigid member coupled to said vacuum switch means and having a notch positioned adjacent one edge of said plate member; said spring means normally biasing said notched member away from said plate member; lever means for moving the notch of said rigid member into latching engagement with the edge of said plate member against the force of said spring means.

4. The device of claim 1 wherein said first means is comprised of overcenter toggle means comprised of first and second toggle members pivotally linked at their first ends to form the knee of said toggle means; the second end of said first link being pivotally coupled to rotate about a stationary point; the second end of said second link being pivotally linked to said vacuum switch means; a substantially L-shaped operating arm having one arm pivotally coupled to rotate said arm about a stationary point; said spring means having first and second ends coupled to the knee of said L-shaped arm and the knee of said toggle means for rapidly moving the knee of said toggle means as said operating arm rotates through the dead center position of said toggle means.

5. The device of claim 4 further comprising first and second stop means for limiting the movement experienced by the knee of said toggle means.

6. The device of claim 4 wherein said interrupter means is mounted upon a drawout carriage; a switchgear cubicle having a door for receiving said carriage; said carriage having roller means pivotally mounted on opposite sides of said carriage; channel means mounted along opposite sidewalls of said cubicle for guiding said roller means; said cubicle door having an elongated opening for receiving said operating arm to permit operation of said vacuum switch means exterior of said cubicle and with said door being closed.

7. The device of claim 6 further comprising interlock means pivotally coupled to said operating arm for thwarting the opening of said cubicle door when said vacuum switch is in said engaged position.

8. The device of claim 6 further comprising interlock means pivotally coupled to said operating arm for thwarting the removal of said carriage when said vacuum switch is in said engaged position.

9. The device of claim 7 wherein said interlock means is comprised of a substantially rectangular shaped interlock member pivotally coupled to said cubicle door and having an elongated notch for receiving said operating arm; a cooperating cross bar mounted in said cubicle adjacent said cubicle door; said interlock member being rotated by said operating arm to a first position abutting said cross bar to prevent removal of said carriage from said cubicle when said vacuum switch means is in the engaged position and being rotated to a second position by said operating arm when said vacuum switch means is in the disengaged position clear of said cross bar to permit opening of said cubicle door and removal of carriage.

10. The device of claim 8 wherein said interlock means is comprised of a substantially rectangular shaped interlock member pivotally coupled to said carriage and having an elongated notch for receiving said operating arm; a cooperating cross bar mounted in said cubicle adjacent said carriage; said interlock member being rotated by said operating arm to a first position abutting said cross bar to prevent opening of said cubicle door when said vacuum switch means is in the engaged position and being rotated to a second position by said operating arm when said vacuum switch means is in the disengaged position clear of said cross bar to permit removal of said carriage from said cubicle.

11. The device of claim 9 further comprising means coupled between said operating arm and said carriage to move said carriage out of said cubicle a predetermined time after said vacuum switch becomes disengaged under control of said operating arm.

No references cited.

BERNARD A. GILHEANY, *Primary Examiner.*

H. A. LEWITTER, *Assistant Examiner.*